United States Patent
Zhou et al.

(10) Patent No.: US 10,941,573 B2
(45) Date of Patent: Mar. 9, 2021

(54) COATED FABRICS INCLUDING EXPANDABLE GRAPHITE

(71) Applicant: Firestone Building Products Company, LLC, Nashville, TN (US)

(72) Inventors: Wensheng Zhou, Carmel, IN (US); Joseph Carr, Indianapolis, IN (US); Michael J. Hubbard, Murfreesboro, TN (US)

(73) Assignee: Firestone Building Products Co., LLC, Nashville, TN (US)

(*) Notice: Subject to any disclaimer, the term of this patent is extended or adjusted under 35 U.S.C. 154(b) by 69 days.

(21) Appl. No.: 16/375,945

(22) Filed: Apr. 5, 2019

(65) Prior Publication Data

US 2019/0226213 A1 Jul. 25, 2019

Related U.S. Application Data

(60) Division of application No. 15/292,925, filed on Oct. 13, 2016, now Pat. No. 10,273,693, which is a
(Continued)

(51) Int. Cl.
*E04D 5/10* (2006.01)
*E04C 2/16* (2006.01)
(Continued)

(52) U.S. Cl.
CPC ............... *E04D 5/10* (2013.01); *B32B 5/022* (2013.01); *B32B 5/024* (2013.01); *B32B 5/026* (2013.01);
(Continued)

(58) Field of Classification Search
CPC ........... B32B 2255/02; B32B 2255/04; B32B 2255/20; B32B 2255/26; B32B 2262/0253; B32B 2262/0276; B32B 2262/062; B32B 2262/101; B32B 2307/3065; B32B 2307/718; B32B 2319/00; B32B 2323/16;
(Continued)

(56) References Cited

U.S. PATENT DOCUMENTS

| 4,284,470 A | 8/1981 | Bondoc |
| 4,491,617 A | 1/1985 | O'Connor et al. |

(Continued)

FOREIGN PATENT DOCUMENTS

| CN | 101550729 A | 10/2009 |
| DE | 19718876 A1 | 11/1998 |

(Continued)

OTHER PUBLICATIONS

International Search Report for Appl. No. PCT/US2014/012732 dated Jul. 4, 2014.
(Continued)

*Primary Examiner* — Arti Singh-Pandey
(74) *Attorney, Agent, or Firm* — Thomas R. Kingsbury; Arthur M. Reginelli (57) ABSTRACT

A method for preparing a roofing membrane in the form of a roll, comprising the steps of: providing a polymeric membrane; providing a fabric having a coating disposed thereon; attaching the polymeric membrane to the fabric to form a composite; and rolling the composite. Wherein the coating includes expandable graphite dispersed within a binder.

7 Claims, 5 Drawing Sheets

Related U.S. Application Data continuation of application No. 13/798,413, filed on Mar. 13, 2013, now abandoned.

(60) Provisional application No. 61/755,666, filed on Jan. 23, 2013.

(51) Int. Cl.

| | | |
|---|---|---|
| *D06N 3/00* | (2006.01) | |
| *B32B 5/02* | (2006.01) | |
| *B32B 25/10* | (2006.01) | |
| *D06N 5/00* | (2006.01) | |
| *E04D 12/00* | (2006.01) | |
| *E04D 5/06* | (2006.01) | |
| *E04D 11/02* | (2006.01) | |
| *B32B 7/12* | (2006.01) | |
| *B32B 27/12* | (2006.01) | |
| *B32B 37/15* | (2006.01) | |

(52) U.S. Cl.
CPC .............. *B32B 7/12* (2013.01); *B32B 25/10* (2013.01); *B32B 27/12* (2013.01); *B32B 37/15* (2013.01); *D06N 3/0006* (2013.01); *D06N 3/0011* (2013.01); *D06N 3/0063* (2013.01); *D06N 5/00* (2013.01); *E04C 2/16* (2013.01); *E04D 5/06* (2013.01); *E04D 11/02* (2013.01); *E04D 12/002* (2013.01); *B32B 2255/02* (2013.01); *B32B 2255/04* (2013.01); *B32B 2255/20* (2013.01); *B32B 2255/26* (2013.01); *B32B 2262/0253* (2013.01); *B32B 2262/0276* (2013.01); *B32B 2262/062* (2013.01); *B32B 2262/101* (2013.01); *B32B 2307/3065* (2013.01); *B32B 2307/718* (2013.01); *B32B 2319/00* (2013.01); *B32B 2323/16* (2013.01); *B32B 2419/00* (2013.01); *B32B 2419/06* (2013.01); *D06N 2201/082* (2013.01); *D06N 2209/067* (2013.01); *D06N 2211/06* (2013.01); *Y10T 428/23986* (2015.04); *Y10T 428/249921* (2015.04); *Y10T 442/20* (2015.04); *Y10T 442/277* (2015.04); *Y10T 442/2861* (2015.04); *Y10T 442/2992* (2015.04)

(58) Field of Classification Search
CPC . B32B 2419/00; B32B 2419/06; B32B 25/10; B32B 27/12; B32B 37/15; B32B 5/022; B32B 5/024; B32B 5/026; B32B 7/12; D06N 2201/082; D06N 2209/067; D06N 2211/06; D06N 3/0006; D06N 3/0011; D06N 3/0063; D06N 5/00; E04C 2/16; E04D 11/02; E04D 12/002; E04D 5/06; E04D 5/10; Y10T 428/23986; Y10T 428/249921; Y10T 442/20; Y10T 442/277; Y10T 442/2861; Y10T 442/2992
See application file for complete search history.

(56) References Cited

U.S. PATENT DOCUMENTS

| | | | |
|---|---|---|---|
| 4,539,254 A | 9/1985 | O'Connor et al. | |
| 4,615,934 A | 10/1986 | Ellison | |
| 4,780,350 A | 10/1988 | O'Connor et al. | |
| 4,871,605 A | 10/1989 | Pagen | |
| 4,996,812 A | 3/1991 | Venable | |
| 5,112,678 A | 5/1992 | Gay | |
| 5,226,392 A | 7/1993 | Breuer et al. | |
| 5,314,556 A | 5/1994 | Woiceshyn | |
| 5,422,179 A | 6/1995 | Dietschi et al. | |
| 5,504,136 A | 4/1996 | Davis et al. | |
| 5,516,817 A | 5/1996 | Slusher et al. | |
| 5,523,357 A | 6/1996 | Peterson | |
| 5,614,256 A | 3/1997 | Wierer | |
| 5,757,592 A | 5/1998 | Arai et al. | |
| 5,981,030 A | 11/1999 | Haupt et al. | |
| 6,055,786 A | 5/2000 | Hubbard et al. | |
| 6,084,008 A | 7/2000 | Liu | |
| 6,207,085 B1 | 3/2001 | Ackerman | |
| 6,451,897 B1 | 9/2002 | Niyogi | |
| 6,502,360 B2 | 1/2003 | Carr, III et al. | |
| 6,506,842 B1 | 1/2003 | Heck et al. | |
| 6,544,596 B2 | 4/2003 | Clemens et al. | |
| 6,706,793 B2 | 3/2004 | Abu-Isa et al. | |
| 6,849,338 B2 | 2/2005 | Clemens et al. | |
| 7,070,844 B2 | 7/2006 | Bartek | |
| 7,300,892 B2 | 11/2007 | Porter | |
| 7,321,010 B2 | 1/2008 | Shooshtari | |
| 7,338,702 B2 | 3/2008 | Swales | |
| 7,429,544 B2 | 9/2008 | Grove | |
| 7,473,440 B2 | 1/2009 | Kajander | |
| 7,605,188 B2 | 10/2009 | Loh et al. | |
| 7,632,763 B2 | 12/2009 | Newton et al. | |
| 7,677,009 B2 | 3/2010 | Bowman | |
| 7,749,924 B2 | 7/2010 | Peng et al. | |
| 7,803,723 B2 | 9/2010 | Herbert et al. | |
| 7,833,575 B2 | 11/2010 | Gupta | |
| 7,833,638 B2 | 11/2010 | Zheng | |
| 7,878,301 B2 | 2/2011 | Gross et al. | |
| 8,178,449 B2 | 5/2012 | La Vietes et al. | |
| 8,968,853 B2 | 3/2015 | Zhou et al. | |
| 9,045,904 B2 | 6/2015 | Hubbard et al. | |
| 2002/0003026 A1 | 1/2002 | Hubbard et al. | |
| 2003/0181597 A1 | 9/2003 | Glogovsky et al. | |
| 2004/0020585 A1 | 2/2004 | Hubbard et al. | |
| 2004/0121152 A1 | 6/2004 | Toas | |
| 2005/0072114 A1 | 4/2005 | Shiao et al. | |
| 2005/0139126 A1 | 6/2005 | Khan et al. | |
| 2005/0145139 A1 | 7/2005 | Khan et al. | |
| 2005/0183831 A1 | 8/2005 | Schwetz et al. | |
| 2005/0257875 A1 | 11/2005 | Khan et al. | |
| 2006/0144012 A1 | 7/2006 | Manning et al. | |
| 2006/0160978 A1 | 7/2006 | Gupta et al. | |
| 2006/0217451 A1 | 9/2006 | Bonapersona | |
| 2006/0240224 A1 | 10/2006 | Khan et al. | |
| 2006/0273290 A1 | 12/2006 | Khan et al. | |
| 2006/0275561 A1 | 12/2006 | Agrawal | |
| 2007/0186505 A1 | 8/2007 | Hubbard et al. | |
| 2007/0193167 A1 | 8/2007 | Bruce et al. | |
| 2007/0194482 A1 | 8/2007 | Douglas et al. | |
| 2007/0208139 A1 | 9/2007 | Raulie et al. | |
| 2007/0277450 A1 | 12/2007 | Raulie | |
| 2008/0102243 A1 | 5/2008 | Gupta | |
| 2008/0160301 A1 | 7/2008 | Nandi | |
| 2008/0184651 A1 | 8/2008 | Bowman | |
| 2008/0188590 A1 | 8/2008 | Gupta | |
| 2008/0241472 A1 | 10/2008 | Shiao et al. | |
| 2009/0137168 A1 | 5/2009 | Peng | |
| 2009/0163097 A1 | 6/2009 | Kajander | |
| 2009/0181216 A1 | 7/2009 | Peng | |
| 2009/0309077 A1 | 12/2009 | Gupta et al. | |
| 2009/0326117 A1 | 12/2009 | Benussi et al. | |
| 2010/0130080 A1 | 5/2010 | Coninx et al. | |
| 2010/0167013 A1 | 7/2010 | Cruz et al. | |
| 2010/0326598 A1 | 12/2010 | Atwater | |
| 2011/0011021 A1 | 1/2011 | La Vietes et al. | |
| 2011/0073239 A1 | 3/2011 | Manning et al. | |
| 2011/0135882 A1 | 6/2011 | Stanley | |
| 2011/0155321 A1 | 6/2011 | Yang et al. | |
| 2011/0173924 A1 | 7/2011 | Ambrose, Jr. et al. | |
| 2011/0185656 A1 | 8/2011 | Klein | |
| 2011/0313084 A1 | 12/2011 | Furar et al. | |
| 2012/0009407 A1 | 1/2012 | Peeler et al. | |
| 2012/0022176 A1 | 1/2012 | Stahl et al. | |
| 2012/0045623 A1 | 2/2012 | Delaney et al. | |
| 2012/0100289 A1 | 4/2012 | Egan et al. | |
| 2012/0174508 A1 | 7/2012 | Brooks et al. | |
| 2012/0189838 A1 | 7/2012 | Pellacani et al. | |
| 2012/0244340 A1 | 9/2012 | Peng et al. | |
| 2012/0266553 A1 | 10/2012 | Shiao et al. | |
| 2013/0036714 A1 | 2/2013 | Bolton et al. | |

(56) References Cited

U.S. PATENT DOCUMENTS

| | | |
|---|---|---|
| 2014/0013693 A1 | 1/2014 | Zhou et al. |
| 2014/0127443 A1 | 5/2014 | Zhou et al. |
| 2014/0141672 A1 | 5/2014 | Hubbard et al. |
| 2014/0205789 A1 | 7/2014 | Zhou et al. |
| 2014/0215937 A1 | 8/2014 | Zhou et al. |
| 2015/0038629 A1 | 2/2015 | Ultsch |
| 2015/0306850 A1 | 10/2015 | Hubbard et al. |

FOREIGN PATENT DOCUMENTS

| | | |
|---|---|---|
| EP | 0752458 A1 | 1/1997 |
| EP | 1541338 A1 | 6/2005 |
| EP | 2532515 A1 | 12/2012 |
| JP | H11172860 A | 6/1999 |
| WO | 2011/029151 A1 | 3/2011 |
| WO | 2012/015538 A1 | 2/2012 |
| WO | 2013/102208 A1 | 7/2013 |
| WO | 2015/013176 A1 | 1/2015 |

OTHER PUBLICATIONS

International Search Report, dated Jul. 4, 2014, International Application PCT/US2014/012683, pp. 1-10.
First Examination Report for related Indian Patent Application No. 5516/DELNP/2015 dated Oct. 14, 2019.

COATED FABRICS INCLUDING EXPANDABLE GRAPHITE

This application is a divisional application of U.S. Non-Provisional Ser. No. 15/292,925 filed Oct. 13, 2016 and now patented as No. U.S. Pat. No. 10,273,693, which is a continuation application of Abandoned U.S. Non-Provisional Ser. No. 13/798,413 filed Mar. 13, 2013, which claims the benefit of U.S. Provisional Application Ser. No. 61/755,666, filed on Jan. 23, 2013, which are incorporated herein by reference.

FIELD OF THE INVENTION

Embodiments of the present invention are directed toward coated fabrics wherein the coating includes expandable graphite. The coated fabrics are particularly useful as construction materials.

BACKGROUND OF THE INVENTION

Coated fabrics are commonly used in the construction industry. These fabrics, which may also be referred to as webbed sheets, coated mats, or coated facers, generally include a fabric, a binder, and a filler. The binder generally serves to adhere the filler particles to the fabric surface.

Coated fabrics have been used as underlayment under roofing or siding, or as facers for various construction materials such as foamed insulation boards.

For example, U.S. Pat. No. 5,112,678 teaches webbed mats coated with an aqueous mixture of mineral pigment, a polymer latex adhesive, and an inorganic binder. The coating yields a liquid impermeable mat that is useful as an underlayment or as a facer in a foam board laminating process.

U.S. Pat. No. 5,614,256 teaches a coating composition for producing water-tight, vapor-permeable, and flame-retardant articles formed by applying the coating composition to a woven, knitted, or non-woven support material. The coating composition includes an aqueous dispersion of a vinyl chloride copolymer, a flame-proofing agent, a crosslinker, and a thickener. The coated textile support materials are useful in building protection such as underlayments for roof tiles or exterior walls.

SUMMARY OF THE INVENTION

Embodiments of the present invention provide a coated fabric comprising a fabric substrate and a coating on said substrate, the coating comprising a binder and expandable graphite dispersed throughout the binder.

DETAILED DESCRIPTION OF ILLUSTRATIVE EMBODIMENTS

Embodiments of the present invention are based, at least in part, on the discovery of a coated fabric wherein the coating includes expandable graphite. Accordingly, coated fabrics of this invention exhibit fire resistivity and/or resistance to flame spread. As a result, the coated fabrics are advantageously useful in preparing construction materials that are characterized by improved flame resistance and/or resistance to flame spread.

In one or more embodiments, coated fabrics include a coating that includes a polymeric binder, expandable graphite, and optionally additional binders and/or fillers. In one or more embodiments, the coating compositions may include other conventional ingredients typically added to fabric coating compositions. In one or more embodiments, the coating is formed by applying a coating composition to a fabric substrate. The coating composition may be an aqueous or solvent-borne composition wherein the constituents of the coating (e.g., binders, fillers, and expandable graphite) are dissolved or dispersed within the compositions.

Fabrics

Figure 1:
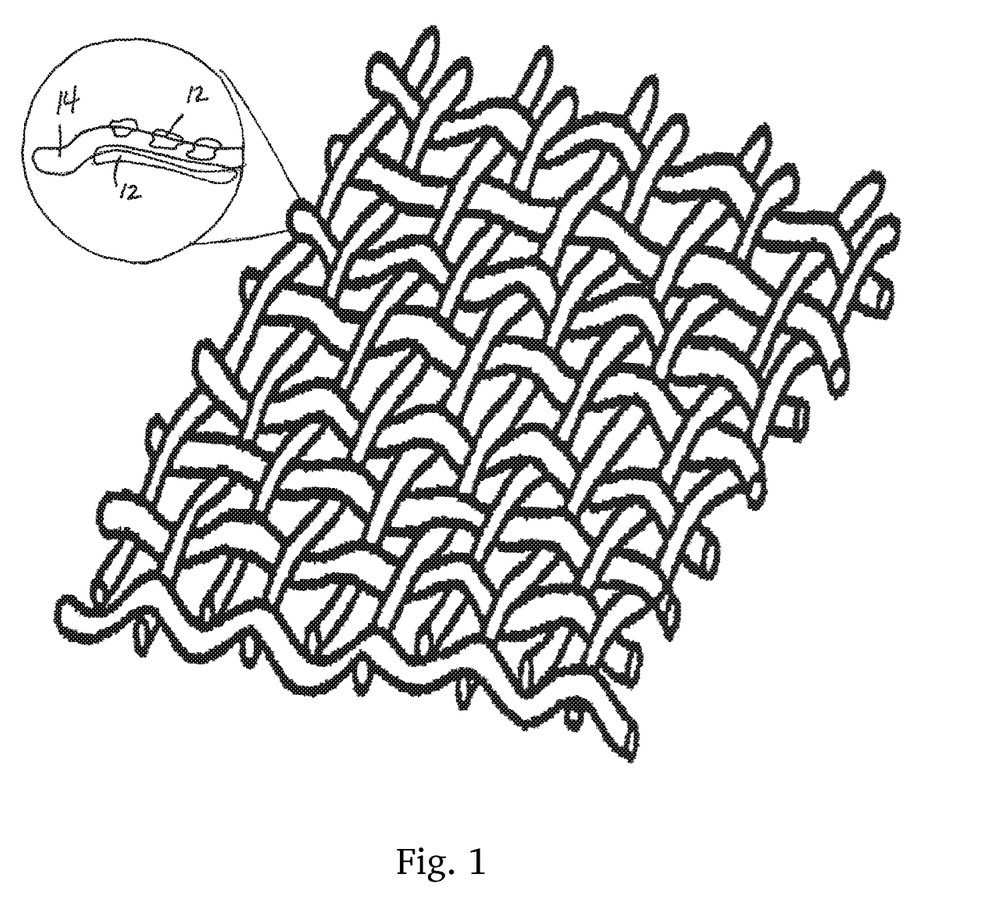
FIG. 1 is a perspective view of a woven fabric according to one or more embodiments of the present invention.
Figure 2:
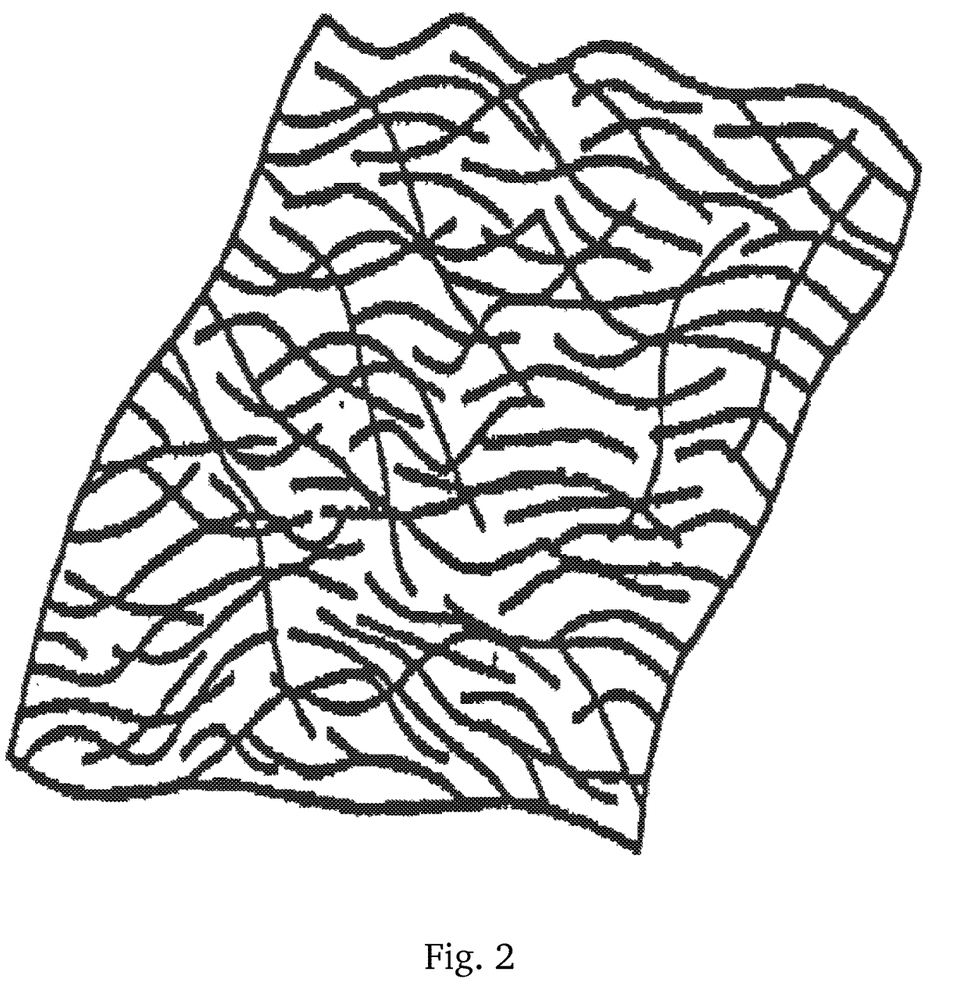
FIG. 2 is a perspective view of a non-woven fabric according to one or more embodiments of the present invention.

The fabric that is coated according to one or more embodiments of the present invention may include a woven, knitted, or non-woven fabric. An exemplary woven fabric is shown in FIG. 1, and an exemplary non-woven fabric is shown in FIG. 2. In one or more embodiments, the coating 12 that is deposited on fiber or filament 14 forms a layer or partial layer with the fiber or filament. In other embodiments, the coating forms a layer or partial layer with the entire surface of the fabric.

In particular embodiments, the fabric is a fiberglass mat such as a non-woven fiberglass mat. The fiber may include one or more substrate coatings in addition to the coatings applied according to the present invention. In other embodiments, the fabric is a polymeric fabric such as a non-woven polyester and/or polypropylene fabric. In particular embodiments, the fabric is a non-woven fiberglass mat characterized by a weight of from about 0.05 to about 0.15 kg/m$^2$, or in other embodiments from about 0.08 to about 0.12 kg/m$^2$. In particular embodiments, the fabric is a non-woven polyester mat characterized by a weight of from about 0.11 to about 0.24 kg/m$^2$, or in other embodiments from about 0.15 to about 0.20 kg/m$^2$. In other embodiments, the fabric is a polymeric fleece such as a polyester or polyolefin fleece.

In one or more embodiments, the fabric is a cellulosic fabric. In particular embodiments, the cellulosic fabric is kraft paper. In particular embodiments, the kraft paper may be reinforced with fiberglass.

In one or more embodiments, the non-woven fiberglass mat may be wet-formed using known techniques such as a Fourdrinier machine.

Exemplary fabrics that may be used in the practice of this invention are disclosed in U.S. Pat. Nos. 7,429,544, 7,338,702, 7,300,892, 7,833,638, 7,473,440, 7,321,010, 4,284,470, 4,539,254, 4,871,605, 5,112,678, and 5,614,256, which are incorporated herein by reference and U.S. Publication Nos 2008/0160301, 2009/0163097, and 2006/0275561, which are incorporated herein by reference.

Binder

Examples of polymer latex binders useful in the practice of one or more embodiments of this invention include, but are not limited to, styrene-butadiene-rubber (SBR), styrene-butadiene-styrene (SBS), ethylene-vinyl-chloride (EVCl), poly-vinylidene-chloride (PVdC), modified poly-vinyl-chloride (PVC), poly-vinyl-alcohol (PVOH), ethylene-vinyl-actate (EVA), and poly-vinyl-acetate (PVA). In one or more embodiments, the binder may include an asphalt. In other embodiments, the binder is devoid of asphalt. In still other embodiments, the binder may include acrylic or epoxy binders or resins, which are known in the art. Generally, acrylic binders or resins include latex polymers that derive from the polymerization of acrylates, acrylic acids, methacrylates, methacrylic acids, acrylonitrile, and/or acrylamide monomer. In other embodiments, the binder may include a polyurethane.

Examples of inorganic binders that may be used with the latex binders include, but are not limited to, calcium oxide, calcium silicate, calcium sulfate, magnesium oxychloride, magnesium oxysulfate, and other complexes of some Group IIA elements (alkaline earth metals), as well as aluminum hydroxide.

In one or more embodiments, a complex inorganic binder such as portland cement, which is a mixture of various calcium-aluminum silicates, may be used. In other embodiments, the oxychloride or oxysulfate of aluminum hydroxide and/or calcium silicate may also be used. In yet other embodiments, quicklime, which does not hydrate in a coating mix, but cures by slowly converting to limestone by adding carbon dioxide from the air, may be used.

Expandable Graphite

Expandable graphite may also be referred to as expandable flake graphite, intumescent flake graphite, or expandable flake; and, for the purposes herein, these terms may be used interchangeably.

In one or more embodiments, expandable graphite includes intercalated graphite in which an intercallant material is included between the graphite layers of graphite crystal or particle. Examples of intercallant materials include halogens, alkali metals, sulfates, nitrates, various organic acids, aluminum chlorides, ferric chlorides, other metal halides, arsenic sulfides, and thallium sulfides. In certain embodiments of the present invention, the expandable graphite includes non-halogenated intercallant materials. In certain embodiments, the expandable graphite includes sulfate intercallants, also referred to as graphite bisulfate. As is known in the art, bisulfate intercalation is achieved by treating highly crystalline natural flake graphite with a mixture of sulfuric acid and other oxidizing agents which act to catalyze the sulfate intercalation.

Commercially available examples of expandable graphite include HPMS Expandable Graphite (HP Materials Solutions, Inc., Woodland Hills, Calif.) and Expandable Graphite Grades 1721 (Asbury Carbons, Asbury, N.J.). Other commercial grades contemplated as useful in the present invention include 1722, 3393, 3577, 3626, and 1722 HT (Asbury Carbons, Asbury, N.J.).

In one or more embodiments, the expandable graphite may be characterized as having a mean or average size in the range from about 30 µm to about 1.5 mm, in other embodiments from about 50 µm to about 1.0 mm, and in other embodiments from about 180 to about 850 µm. In certain embodiments, the expandable graphite may be characterized as having a mean or average size of at least 30 µm, in other embodiments at least 44 µm, in other embodiments at least 180 µm, and in other embodiments at least 300 µm. In one or more embodiments, expandable graphite may be characterized as having a mean or average size of at most 1.5 mm, in other embodiments at most 1.0 mm, in other embodiments at most 850 µm, in other embodiments at most 600 µm, in yet other embodiments at most 500 µm, and in still other embodiments at most 400 µm. Useful expandable graphite includes Graphite Grade #1721 (Asbury Carbons), which has a nominal size of greater than 300 µm.

In one or more embodiments of the present invention, the expandable graphite may be characterized as having a nominal particle size of 20×50 (US sieve). US sieve 20 has an opening equivalent to 0.841 mm and US sieve 50 has an opening equivalent to 0.297 mm. Therefore, a nominal particle size of 20×50 indicates the graphite particles are at least 0.297 mm and at most 0.841 mm.

In one or more embodiments, the expandable graphite may be characterized as having a carbon content in the range from about 70% to about 99%. In certain embodiments, the expandable graphite may be characterized as having a carbon content of at least 80%, in other embodiments at least 85%, in other embodiments at least 90%, in yet other embodiments at least 95%, in other embodiments at least 98%, and in still other embodiments at least 99% carbon.

In one or more embodiments, the expandable graphite may be characterized as having a sulfur content in the range from about 0% to about 8%, in other embodiments from about 2.6% to about 5.0%, and in other embodiments from about 3.0% to about 3.5%. In certain embodiments, the expandable graphite may be characterized as having a sulfur content of at least 0%, in other embodiments at least 2.6%, in other embodiments at least 2.9%, in other embodiments at least 3.2%, and in other embodiments 3.5%. In certain embodiments, the expandable graphite may be characterized as having a sulfur content of at most 8%, in other embodiments at most 5%, in other embodiments at most 3.5%.

In one or more embodiments, the expandable graphite may be characterized as having an expansion ratio (cc/g) in the range from about 10:1 to about 500:1, in other embodiments at least 20:1 to about 450:1, in other embodiments at least 30:1 to about 400:1, in other embodiments from about 50:1 to about 350:1. In certain embodiments, the expandable graphite may be characterized as having an expansion ratio (cc/g) of at least 10:1, in other embodiments at least 20:1, in other embodiments at least 30:1, in other embodiments at least 40:1, in other embodiments at least 50:1, in other embodiments at least 60:1, in other embodiments at least 90:1, in other embodiments at least 160:1, in other embodiments at least 210:1, in other embodiments at least 220:1, in other embodiments at least 230:1, in other embodiments at least 270:1, in other embodiments at least 290:1, and in yet other embodiments at least 300:1. In certain embodiments, the expandable graphite may be characterized as having an expansion ratio (cc/g) of at most 350:1, and in yet other embodiments at most 300:1.

In one or more embodiments, the expandable graphite, as it exists with the asphaltic component of the asphaltic sheet of the present invention, is partially expanded. In one or more embodiments, the expandable graphite is not expanded, however, to a deleterious degree, which includes that amount or more of expansion that will deleteriously the ability to form the sheet product and the ability of the graphite to serve as flame retardant at desirable levels, which include those levels that allow proper formation of the sheet. In one or more embodiments, the expandable graphite is expanded to at most 100%, in other embodiments at most 50%, in other embodiments at most 40%, in other embodiments at most 30%, in other embodiments at most 20%, and in other embodiments at most 10% beyond its original unexpanded size.

In one or more embodiments, the expandable graphite may be characterized as having a pH in the range from about 1 to about 10; in other embodiments from about 1 to about 6; and in yet other embodiments from about 5 to about 10. In certain embodiments, the expandable graphite may be characterized as having a pH in the range from about 4 to about 7. In one or more embodiments, the expandable graphite may be characterized as having a pH of at least 1, in other embodiments at least 4, and in other embodiments at least 5. In certain embodiments, the expandable graphite may be characterized as having a pH of at most 10, in other embodiments at most 7, in other embodiments at most 6.5, in other embodiments at most 6, and in other embodiments at most 5.

In one or more embodiments, the expandable graphite may be characterized by an onset temperature ranging from about 100° C. to about 280° C.; in other embodiments from about 160° C. to about 225° C.; and in other embodiments from about 180° C. to about 200° C. In one or more embodiments, the expandable graphite may be characterized by an onset temperature of at least 100° C., in other embodiments at least 130° C., in other embodiments at least 160° C., in other embodiments at least 170° C., in other embodiments at least 180° C., in other embodiments at least 190° C., and in other embodiments at least 200° C. In one or more embodiments, the expandable graphite may be characterized by an onset temperature of at most 250° C., in other embodiments at most 225° C., and in other embodiments at most 200° C. Onset temperature may also be interchangeably referred to as expansion temperature; it may also be referred to as the temperature at which expansion of the graphite starts.

Fillers

In one or more embodiments, useful fillers include, but are not limited to, ground limestone (calcium carbonate), clay, sand, mica, talc, gypsum (calcium sulfate), aluminum trihydrate (ATH), antimony oxide, or a combination of any two or more of these substances. In one or more embodiments, the filler is characterized by a particle size such that at least 95% of the filler passes a 325 mesh wire screen.

Other Constituents

In one or more embodiments, the coating compositions may include other constituents such as flow and leveling agents, defoaming agents, stabilizers, preservatives, thickeners, dispersants, waxes, processing agents, surfactants, pH buffers or adjusters, and the like.

Amounts

In one or more embodiments, the coating composition employed to coat the fabrics according to the present invention include at least 10% by wt., in other embodiments at least 20% by wt., and in other embodiments at least 30% by wt. solids based on the total weight of the coating composition. In these or other embodiments, the coating compositions include at most 80% by wt., in other embodiments at most 70% by wt., and in other embodiments at most 60% by wt., solids based on the entire weight of the coating composition. In one or more embodiments, the coating compositions include from about 10 to about 80, in other embodiments from about 20 to about 70, and in other embodiments from about 30 to about 60% by wt. solids based on the entire weight of the coating composition.

In one or more embodiments, the coating compositions include at least 5% by wt., in other embodiments at least 10% by wt., and in other embodiments at least 15% by wt. polymeric binder (solids) based on the total weight of the coating composition. In these or other embodiments, the coating compositions include at most 75% by wt., in other embodiments at most 65% by wt., and in other embodiments at most 55% by wt., polymeric binder (solids) based on the entire weight of the coating composition. In one or more embodiments, the coating compositions include from about 5 to about 75, in other embodiments from about 10 to about 65, and in other embodiments from about 15 to about 55% by wt. polymeric binder based on the entire weight of the coating composition.

In one or more embodiments, the coating compositions include at least 1% by weight, in other embodiments at least 2% by wt., in other embodiments at least 5% by wt., and in other embodiments at least 7% by wt. expandable graphite based on the total weight of the solids component of the coating composition. In these or other embodiments, the coating compositions include at most 50% by wt., in other embodiments at most 40% by wt., and in other embodiments at most 30% by wt., expandable graphite based on the total weight of the solids component of the coating composition. In one or more embodiments, the coating compositions include from about 2 to about 50, in other embodiments from about 5 to about 40, and in other embodiments from about 7 to about 30% by wt. expandable graphite based on the total weight of the solids component of the coating composition.

In one or more embodiments, the coating compositions include at least 1% by wt., in other embodiments at least 3% by wt., and in other embodiments at least 5% by wt. inorganic binder based on the total weight of the solids component of the coating composition. In these or other embodiments, the coating compositions include at most 20% by wt., in other embodiments at most 15% by wt., and in other embodiments at most 10% by wt., inorganic binder based on the total weight of the solids component of the coating composition. In one or more embodiments, the coating compositions include from about 0 to about 20, in other embodiments from about 1 to about 15, and in other embodiments from about 3 to about 10% by wt. inorganic binder based on the total weight of the solids component of the coating composition. In particular embodiments, the coating composition is devoid of inorganic binder.

In one or more embodiments, the coating compositions include at least 1% by wt., in other embodiments at least 3% by wt., and in other embodiments at least 5% by wt. filler based on the total weight of the solids component of the coating composition. In these or other embodiments, the coating compositions include at most 90% by wt., in other embodiments at most 70% by wt., in other embodiments at most 50% by wt., and in other embodiments at most 30% by wt., filler based on the total weight of the solids component of the coating composition. In one or more embodiments, the coating compositions include from about 0 to about 70, in other embodiments from about 3 to about 50, and in other embodiments from about 5 to about 30% by wt. filler based on the total weight of the solids component of the coating composition. In particular embodiments, the coating composition is devoid of fillers other than expandable graphite.

Method of Making

In one or more embodiments, conventional methods for coating fabrics may be employed in the practice of this invention. As an example, U.S. Pat. No. 5,112,678 is incorporated herein by reference. A raw glass mat (e.g., the "substrate") enters a coating station at a level lower than a top of an applicator roll. The direction of travel of the glass mat is parallel to a "machine direction" (M.D.) of a facer produced by the machine, while a dimension perpendicular to the machine direction is understood to be the "cross machine direction" (C.M.D.) of a resultant facer similarly oriented. The applicator roll is driven to rotate about its axis (either clockwise or counterclockwise). A coating pan is filled with a coating mix up to a level that is sufficient for the applicator roll to pull an adequate amount of coating to the top of the applicator roll. The speed of rotation of applicator roll is used to get adequate amounts of coating mix up into the glass mat as the glass mat is conveyed. In its path of conveyance, the glass mat extends around applicator roll in a wrap-arc. A scraper blade is placed so that the excess coating scraped off returns into the coating pan. After the excess is scraped off, the coated mat proceeds into a dryer section where the coated glass mat facer is dried and wrapped into rolls.

INDUSTRIAL APPLICABILITY

Figure 3:
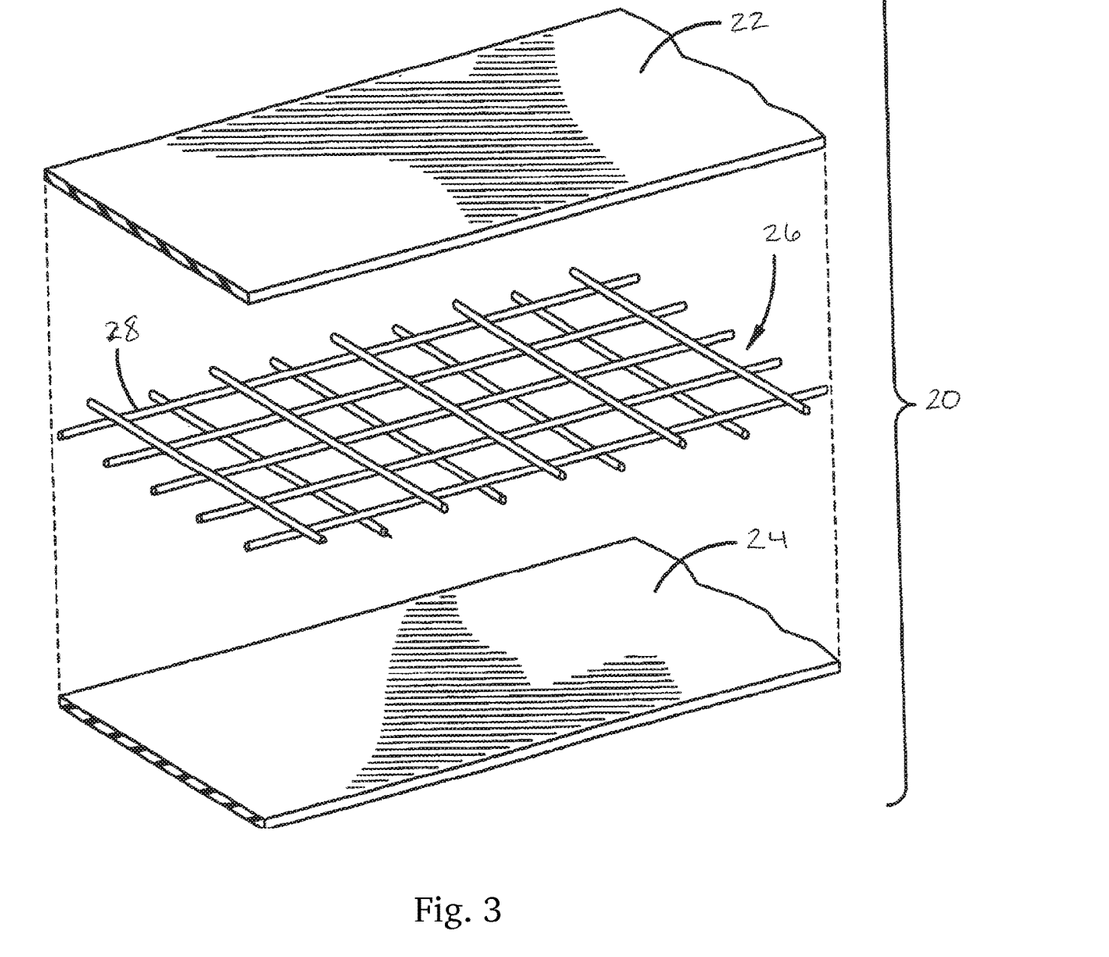
FIG. 3 is an exploded perspective view of a membrane including a fabric reinforcement according to one or more embodiments of the present invention.

In one or more embodiments, the coated fabrics of the present invention can be used as reinforcements in various membranes. For example, the coated fabric can be used as reinforcement in roofing membranes such as asphaltic membranes, thermoplastic membranes (e.g., PVC and TPO membranes), and rubber membranes (EPDM membranes). An exemplary membrane is shown in FIG. 3. The membrane 20, which is shown in exploded view, includes polymeric layers (e.g., polyolefin or EPDM) 22 and 24. Sandwiched therebetween is reinforcement 26 that carries coating 28 according to one or more embodiments of the present invention.

Figure 4:
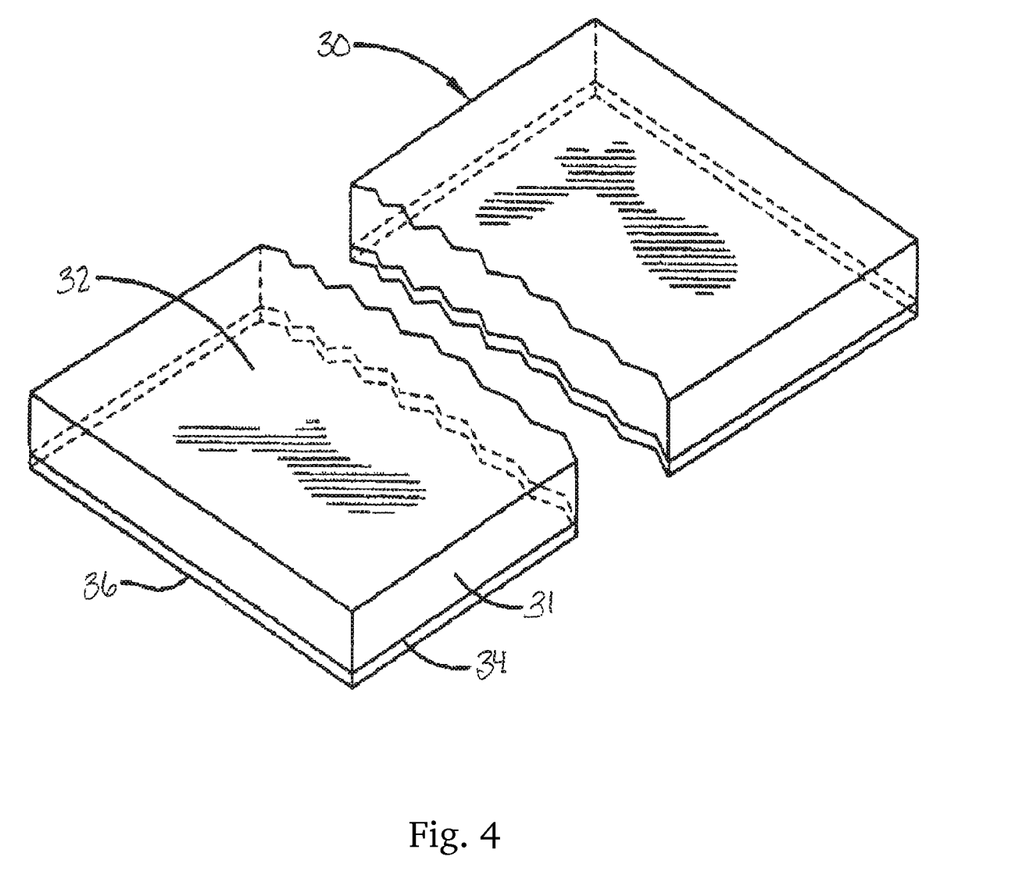
FIG. 4 is a cross-section perspective view of an insulation board having a fabric facer according to one or more embodiments of the present invention.

In one or more embodiments, the coated fabrics of the present invention can be used as facers for various construction boards including, but not limited to, polyisocyanurate and polyurethane insulation boards, cover boards, and gypsum boards. An exemplary insulation board is shown in FIG. 4. The board 30 includes foam body 31 having first and second planar surfaces 32 and 34, respectively. At least one planar surface (e.g., planar surface 34) is mated with and/or adhered to facer 36, which includes a coating pursuant to one or more embodiments of this invention.

Figure 5:
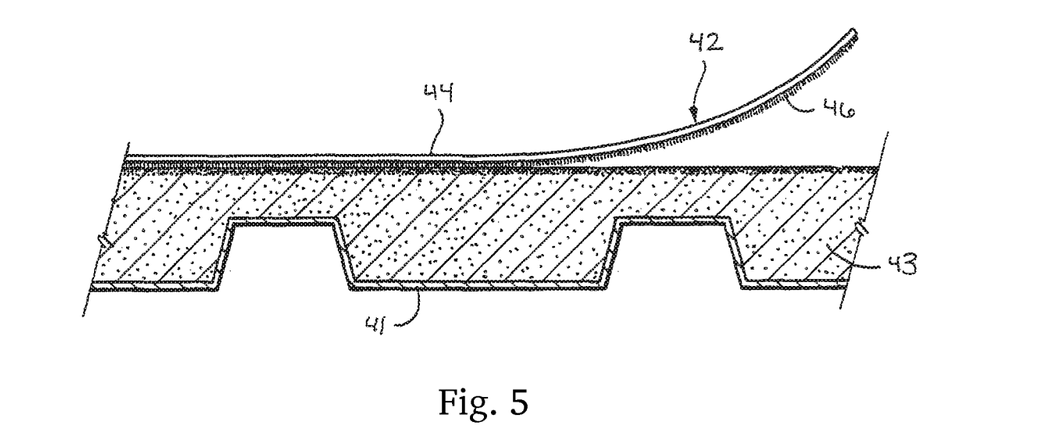
FIG. 5 is a cross-sectional view of a membrane carrying a fleece backing according to one or more embodiments of the present invention.

In still other embodiments, the coated fabrics of the present invention may be used as backing or surface treatments for various construction materials. For example, the fabrics may be used as fleece backing for roofing membranes. An exemplary membrane carrying a fleece backing is shown in FIG. 5. Specifically, membrane 42 includes polymeric layer 44 and fleece backing 46, which is adhered or otherwise secured thereto. As is known in the art, especially where the membrane is a TPO membrane, the backing (e.g. fleece backing coated pursuant to this invention) may be secured by mating the backing to the TPO membrane while the membranes is in its molten or semi-molten state. In other embodiments, such as in the case of an EPDM membrane, the backing is secured using other modes of attachment such as chemical or adhesive attachment. As is known in the art, this membrane can be applied to roof surface 41 by employing adhesive 43. In other embodiments, the membrane carrying the backing (e.g. fabric coated pursuant to this invention) can be secured to the roof using mechanical attachment mechanisms, which are readily known in the art. Fleece or other fabric 46 carries a coating pursuant to one or more embodiments of the present invention.

Figure 6:
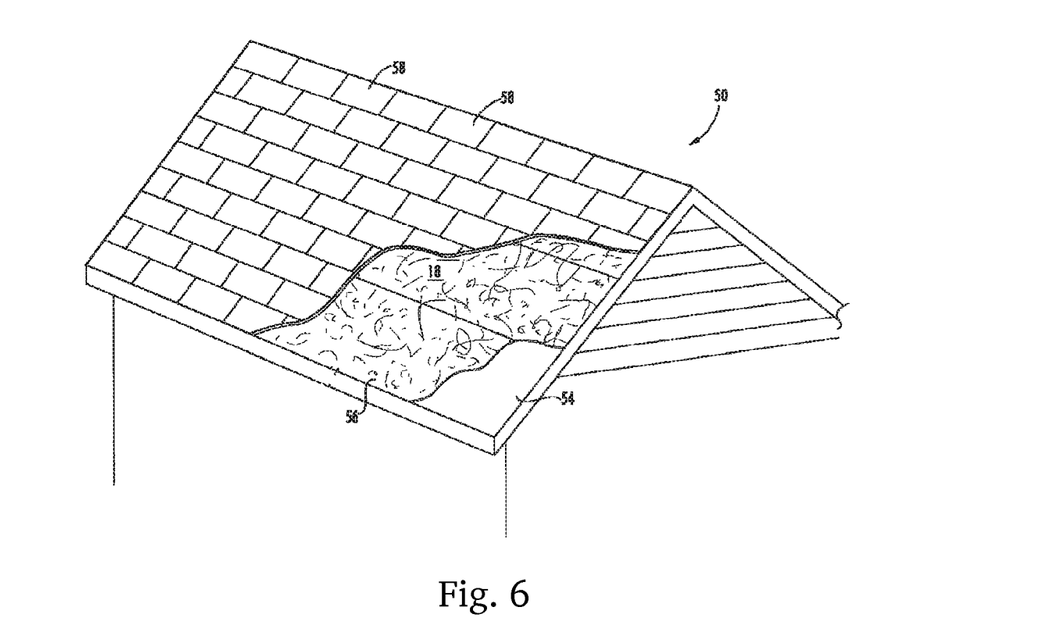
FIG. 6 is a perspective view of an underlayment fabric according to one or more embodiments of the present invention.

In yet other embodiments, the coated fabrics of the present invention can be used as underlayments in various construction situations such as roofing underlayment and floor underlayment. For example, roofing underlayment may be used in conjunction with shingles or metal roof systems. Also, as is known in the art, floor underlayment may be used in conjunction with tile flooring. An exemplary underlayment is shown in FIG. 6. Roofing system 50 includes roof deck 54 having deposited thereon underlayment 56. Covering underlayment 56 is an exterior shingle 58, although the skilled person will understand that a metal roof exterior may also be applied. Underlayment 56 includes a coating according to embodiments of the present invention.

In yet other embodiments, the coated fabrics of the present invention may be used as barrier fabrics in various construction situations. For example, the coated fabrics can be used as fire barriers, vapor barriers, and moisture barriers in walls.

Various modifications and alterations that do not depart from the scope and spirit of this invention will become apparent to those skilled in the art. This invention is not to be duly limited to the illustrative embodiments set forth herein.

What is claimed is:

1. An asphaltic composite comprising:
   (i) an asphaltic body having first and second planar surfaces; and
   (ii) a coated fabric subcomposite secured to a planar surface of the asphaltic body, where the coated fabric subcomposite includes a fabric substrate and a coating that includes a binder and expandable graphite dispersed throughout the binder, where the expandable graphite has an onset temperature of at least 160° C., and wherein the coated fabric subcomposite is secured to the asphaltic body by virtue of being mated to the asphaltic body while the asphaltic body is in a molten or semi-molten state.

2. The asphaltic membrane of claim 1 wherein the expandable graphite has an onset temperature of at least 170° C.

3. The asphaltic membrane of claim 1, wherein the expandable graphite has an onset temperature of at least 180° C.

4. The asphaltic membrane of claim 1, wherein the coating is devoid of an inorganic binder.

5. The asphaltic membrane of claim 1, wherein the binder is a polymeric binder.

6. The asphaltic membrane of claim 1, wherein the fabric substrate is a fleece.

7. An asphaltic composite comprising:
   (i) an asphaltic body having first and second planar surfaces; and
   (ii) a coated fabric subcomposite thermally bonded to a planar surface of the asphaltic body, where the coated fabric subcomposite includes a fabric substrate and a coating that includes a binder and expandable graphite dispersed throughout the binder, and where the expandable graphite has an onset temperature of at least 160° C.

* * * * *